(12) United States Patent
Otake

(10) Patent No.: US 7,426,733 B2
(45) Date of Patent: Sep. 16, 2008

(54) AUTOMATIC PROGRAM CHANGING METHOD FOR CLIENT PROGRAM INTERFACE

(75) Inventor: Atsushi Otake, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 909 days.

(21) Appl. No.: 10/715,121

(22) Filed: Nov. 18, 2003

(65) Prior Publication Data

US 2004/0205144 A1 Oct. 14, 2004

(30) Foreign Application Priority Data

Mar. 5, 2003 (JP) .............................. 2003-057936

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/310; 709/219
(58) Field of Classification Search ................. 719/310; 709/219

See application file for complete search history.

(56) References Cited

U.S. PATENT DOCUMENTS

| | | | | |
|---|---|---|---|---|
| 6,185,609 B1 * | 2/2001 | Rangarajan et al. | ......... | 709/219 |
| 7,127,700 B2 * | 10/2006 | Large | .......................... | 717/100 |
| 7,269,620 B2 * | 9/2007 | Bes et al. | ..................... | 709/203 |
| 7,308,475 B1 * | 12/2007 | Pruitt et al. | .................. | 709/203 |
| 2002/0099738 A1 * | 7/2002 | Grant | .......................... | 707/513 |
| 2002/0178218 A1 * | 11/2002 | Butlin | ......................... | 709/203 |
| 2003/0005128 A1 * | 1/2003 | Hickman et al. | ............. | 709/227 |
| 2003/0220925 A1 * | 11/2003 | Lior | ............................. | 707/10 |
| 2004/0117199 A1 * | 6/2004 | Fremantle et al. | .............. | 705/1 |
| 2004/0133633 A1 * | 7/2004 | Fearnley et al. | .............. | 709/203 |
| 2004/0133656 A1 * | 7/2004 | Butterworth et al. | ........ | 709/219 |
| 2004/0221017 A1 * | 11/2004 | Yoon | .......................... | 709/217 |

FOREIGN PATENT DOCUMENTS

JP P2001-159978 A 6/2001

OTHER PUBLICATIONS

"Java Web Services", David A. Chappell et al. 2002, pp. 25-53, pp. 72-95, pp. 98-139.

* cited by examiner

*Primary Examiner*—Meng-Ai An
*Assistant Examiner*—KimbleAnn Verdi
(74) *Attorney, Agent, or Firm*—McDermott Will & Emery LLP

(57) ABSTRACT

In a method of automatically changing a client program in a client/server system, when an access request is transmitted from a client program to a server program and an error occurs, the cause of the error is analyzed and when the error is caused by change of an interface of the server program, a change location of the interface of the server program is detected. A change portion and a changing scheme of the client program related to the change of the interface are decided to change the client program and the client program being currently operated is replaced by the changed client program.

8 Claims, 23 Drawing Sheets

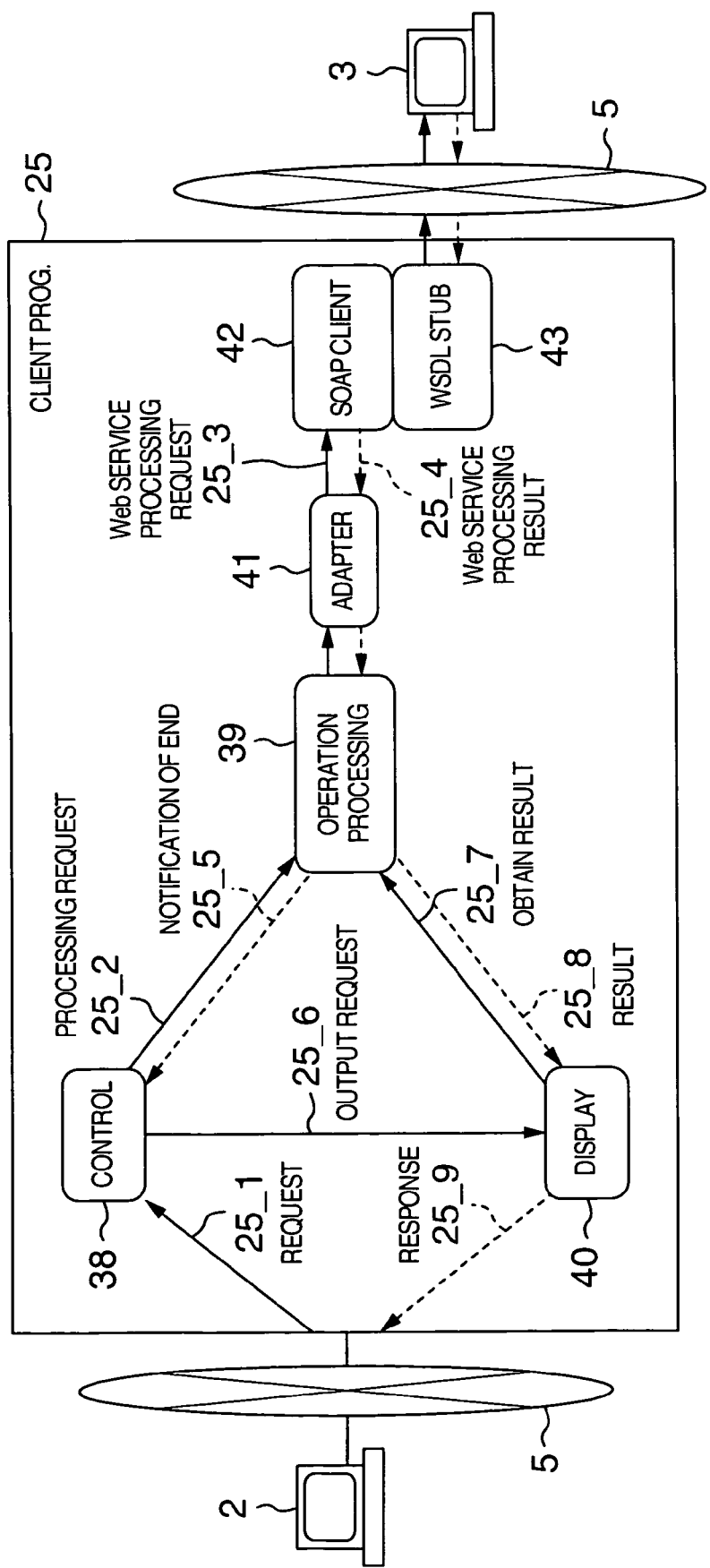

FIG.3

```
    :
<message name="setJukiList">           ~101
    < part name="Name" type="xsd:string"/>        ~102
    < part name="Address" type="xsd:string"/>     ~103
    < part name="Age" type="xsd:string"/>         ~104
</message>
    :
```

FIG.4

```
    :
<message name="setJukiList">           ~101
    < part name="Name" type="xsd:string"/>        ~102
    < part name="Address" type="xsd:string"/>     ~103
    < part name="Age" type="xsd:string"/>         ~104
    < part name="Birthday" type="xsd:string"/>
</message>                                        ~105
    :
```

FIG.5

```
<html> ~201
<head> ~202
<title> RESIDENT'S BASIC INFORMATION INPUT </title> ~203
</head>
<body> ~204
<center> RESIDENT'S BASIC INFORMATION INPUT ~205
<form method="POST" action="SETJUKI"> ~206
    <p>Name<input type="text" name="Name" size="100"></p> ~207
    <p>Address<input type="text" name="Address" size="100"></p> ~208
    <p>Age<input type="text" name="Age" size="100"></p> ~209
    <p><input type="submit" value=" TRANSMIT " name="B1"> ~210
        <input type="reset" value=" RESET " name="B2"></p> ~211
</form>
</center>
</body>
</html>
```

FIG.6

```
<html> ~201
<head> ~202
<title> RESIDENT'S BASIC INFORMATION INPUT </title> ~203
</head>
<body> ~204
<center> RESIDENT'S BASIC INFORMATION INPUT ~205
<form method="POST" action="SETJUKI"> ~206
    <p>Name<input type="text" name="Name" size="100"></p> ~207
    <p>Address<input type="text" name="Address" size="100"></p> ~208
    <p>Age<input type="text" name="Age" size="100"></p> ~209
    <p>Birthday<input type="text" name="Birthday" size="100"></p> ~212
    <p><input type="submit" value=" TRANSMIT " name="B1"> ~210
        <input type="reset" value=" RESET " name="B2"></p> ~211
</form>
</center>
</body>
</html>
```

FIG.9

```
2010 package jp.co.Ohtake.wsdl;

2020 public interface JukiList_Service {
2030   boolean setJukiList(String Name,String Address,String Age);
2040 }

2050 package jp.co.Ohtake.wsdl;

2060 import registry.Registry;
2070 import registry.RegistryException;

2080 public class JukiList_ServiceHelper{
2090   public static JukiList_Service bind() throws RegistryException{
2100          return bind("http://www.ohtake_service/wsdl/JukiListService.wsdl");
2110   }
2120   public static JukiList_Service bind(Satring url) throws RegistryException{
2130          return (JukiList_Service)Registry.bind( url, JukiList_Servive.class);
2140   }
2150 }
```

FIG.10

2010 package jp.co.Ohtake.wsdl;

2020 public interface JukiList_Service {
2160   boolean setJukiList(String Name,String Address,String Age,String Birthday);
2040 }

2050 package jp.co.Ohtake.wsdl.;

2060 import registry.Registry;
2070 import registry.RegistryException;

2080 public class JukiList_ServiceHelper{
2090   public static JukiList_Service bind() throws RegistryException{
2100           return bind("http://www.ohtake_service/wsdl/JukiListService.wsdl");
2110   }
2120   public static JukiList_Service bind(Satring url) throws RegistryException{
2130           return (JukiList_Service)Registry.bind( url, JukiList_Servive.class);
2140   }
2150 }

FIG.11

3010 package jp.co.Ohtake.wsdl;

3020 public class Invoke_jukiList{
3030   public boolean setjuki(String Name, String Address, String Age ) throws
                                                                  Exception{
3040           JukiList_Service jukiListService = JukiList_ServiceHelper.bind();
3050           boolean rtn = jukiListService.setJukiList( Name, Address, Age );
3060   }
3070 }

FIG.12

4010 package jp.co.Ohtake.adapter;

4020 import jp.co.Ohtake.wsdl.*;
4030 import javax.servlet.http.*;

4040 public class adp_Invoke_jukiList{
4050   public Boolean adp_setjuki( HttpServletRequest request )throws Exception{
4060        boolean adp_rtn = false;
4070        String adp_name=request.getAttribute( "Name" );
4080        String adp_address=request.getAttribute( "Address" );
4090        String adp_age=request.getAttribute( "Age" );

4100        Invoke_jukiList soapclient = new Invoke_jukiList();
4120        adp_rtn = soapclient.setjuki(adp_name, adp_address, adp_age );
4130        return adp_rtn;
4140 }
4150 }

FIG.13

3010 package jp.co.Ohtake.wsdl.

3020 public class Invoke_jukiList{
3080   public boolean setjuki(String Name,String Address,String Age,String Birthday )   throws Exception{
3040    JukiList_Service jukiListService = JukiList_ServiceHelper.bind();
3090    boolean rtn = jukiListService.setJukiList( Name, Address, Age, Birthday );
3060  }
3070 }

FIG.14

```
4010 package jp.co.Ohtake.adapter;

4020 import jp.co.Ohtake.wsdl.*;
4030 import javax.servlet.http.*;

4040 public class adp_Invoke_jukiList{
4050    public Boolean adp_setjuki( HttpServletRequest request )throws Exception{
4060        boolean adp_rtn = false;
4070        String adp_name=request.getAttribute( "Name" );
4080        String adp_address=request.getAttribute( "Address" );
4090        String adp_age=request.getAttribute( "Age" );
4160        String adp_birthday=request.getAttribute( "Birthday" );

4100        Invoke_jukiList soapclient = new Invoke_jukiList();
4170        adp_rtn=soapclient.setjuki(adp_name,adp_address,adp_age,
adp_birthday);
4140    }
4150 }
```

AUTOMATIC PROGRAM CHANGING METHOD FOR CLIENT PROGRAM INTERFACE

BACKGROUND OF THE INVENTION

The present invention relates to a program change management method and more particularly to automatic change of a client program in the Web service.

Recently, a client/server program utilizes the distributed object technique to advance the effective utilization of resources and making the resources into parts. As the distributed object technique using the Internet to exceed the local network, there is the Web service described in "Java Web Services" by David A. Cbappell etc. (published by O'Reilly & Associates, Inc., March 2002) (Terms of Java and related to Java are trademarks or registered trademarks of Sun Microsystems, Inc). In this literature, three techniques including SOAP (Simple Object Access Protocol), WSDL (Web Service Description Language) and UDDI (Universal Description Discovery and Integration) are described as fundamental techniques of the Web service.

According to the literature, the SOAP (Simple Object Access Protocol) is the definition of envelope structure used in exchange of structured documents and the structured document described in accordance with this definition are named SOAP message. In the client/server program using the Web service, the SOAP message is used to make communication. Such technique is disclosed in pages 25 to 53 of the literature.

The WSDL (Web Service Description Language) is a format of the structured document for defining the interface of the Web service. In the client/server program using the Web service, the WSDL file described in accordance with the WSDL format is used as an interface to make communication using the SOAP message. Such technique is disclosed in pages 72 to 95 of the literature.

The UDDI (Universal Description Discovery and Integration) presents the global registry and the standard specification for the Web service and is disclosed as the registry utilizable in common in the Internet. Accordingly, in the client/server program using the Web service, the Web service of the server program is registered in the UDDI registry and the client program retrieves the Web service registered in the UDDI registry to thereby make it possible to utilize the Web service of the server program. Such technique is disclosed in pages 98 to 139 of the literature.

In the Web service, it is assumed that interface definition information of the server program on the reception side of an access request is changed. The client program must be also changed in response to the change of the interface definition information. However, the change of the interface definition information is not notified to the client clearly. The client program prepared in accordance with the interface definition information that is not revised is not fit to the new interface to thereby cause an error. The maintenance person of the client program analyzes the cause of error generated by the client program to obtain the revised interface definition information and corrects the client program in accordance with the revised interface definition information.

In production of the client program in accordance with the conventional system, the client program is produced from the interface definition information and a prototype that is a kind of source code. Accordingly, even if it is understood that the error generated in the client program being executed is caused by change of the interface definition information, the maintenance person once stops the client program and obtains the revised interface definition information. Then, the maintenance person prepares the prototype of the client program in accordance with the revised interface definition information again and performs the changing operation of the client program while judging the correspondence relation between the change portion of the interface definition information and the corrected portion of the program, so that labor and time are required. During the changing operation of the client program, the user cannot use the client program.

SUMMARY OF THE INVENTION

It is an object of the present invention to automatically make correction caused by change of an interface of the server program in the client program and replacement of the client program being executed by the corrected client program.

It is another object of the present invention to shorten the service stop term caused by the correction and the replacement of the client program.

In order to achieve the above objects, in the method of changing the client program in the client/server system, when an access request is transmitted from the client program to the server program and an error occurs, the cause of the error is analyzed. When the error is caused by change of an interface of the server program, a change location of the interface of the server program is detected and a change portion and a changing scheme of the client program related to the change of the interface are decided. The client program is changed and the client program being currently operated is replaced by the changed client program.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram schematically illustrating a client program;

FIG. 3 shows an example of a message definition of an unrevised WDSL file;

FIG. 4 shows an example of a message definition of a revised WDSL;

FIG. 5 shows an example of an unrevised JSP file of the client program;

FIG. 6 shows an example of a revised JSP file of the client program;

FIG. 9 shows an example of unrevised WDSL stub program codes;

FIG. 10 shows an example of revised WDSL stub program codes;

FIG. 11 shows an example of unrevised SOAP client program codes;

FIG. 12 shows an example of unrevised adapter program codes;

FIG. 13 shows an example of revised SOAP client program codes;

FIG. 14 shows an example of revised adapter program codes;

DESCRIPTION OF THE EMBODIMENTS

1. System Configuration

Figure 1:
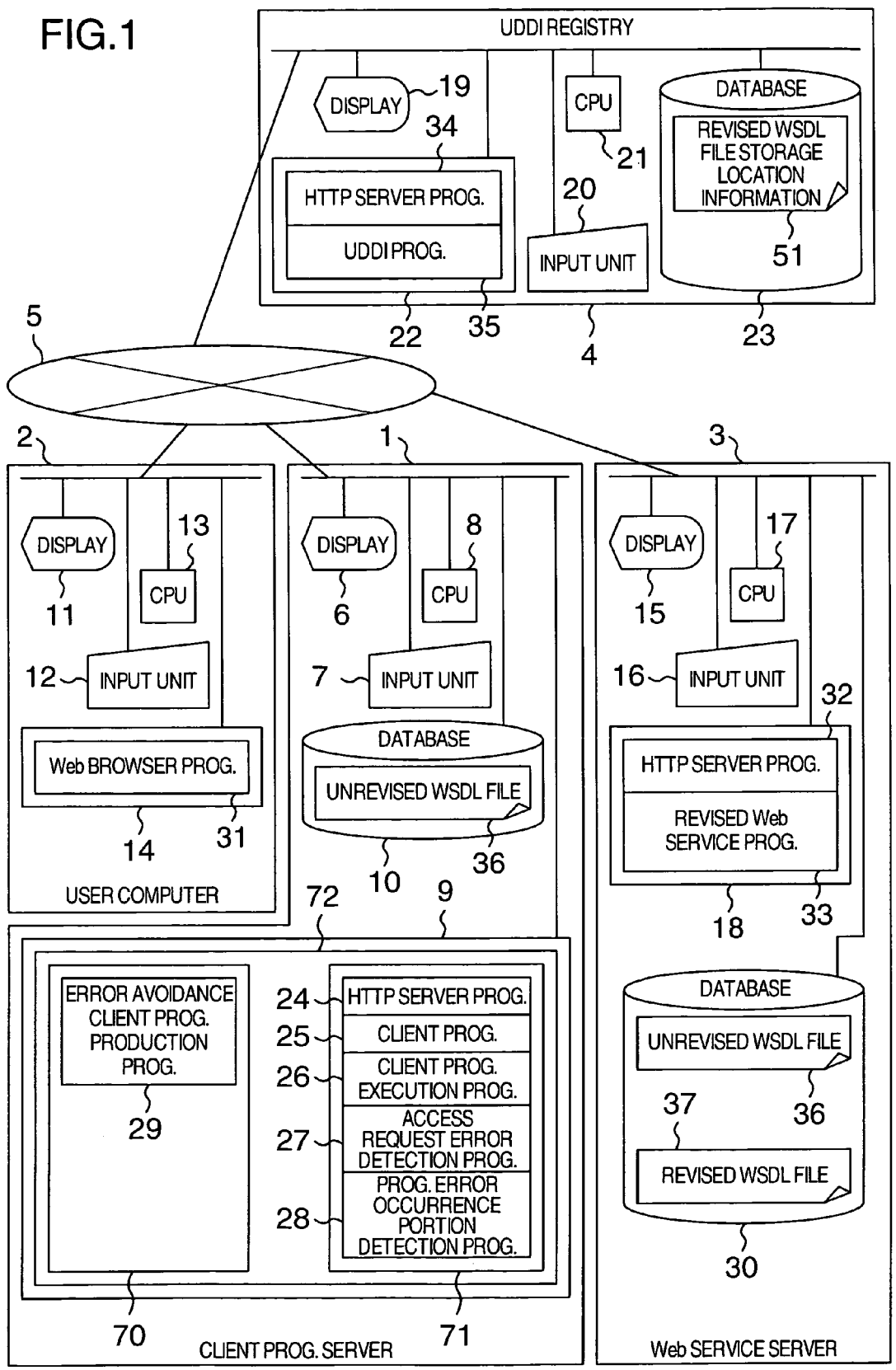
FIG. 1 is a block diagram schematically illustrating a system according to the present invention.

FIG. 1 illustrates a system of the embodiment.

A computer 1 connected to a network 5 is a server for managing and executing a client program and is named a client program server. A computer 2 is a general user computer which utilizes the client program of the client program server 1. A computer 3 connected to the network is a Web service server in which a program for providing the Web service is stored. Further, a computer 4 is a UDDI registry in which a database for registering and managing the Web service is stored.

In FIG. 1, the client server 1, the user computer 2 and the Web service server 3 are shown by ones, although each of these elements may be provided in the plural manner. The UDDI registry 4 may be an independent computer or may have hardware shared with the Web service server 3.

In the embodiment, communication means between the server and client is not required to be specified, while description is made on the premise that communication is made by the HTTP (Hyper Text Transfer Protocol) in the Internet. That is, the client program server 1 has the function of serving as an HTTP server and the user computer 2 communicates with the client program server 1 through the Web browser. The Web service server 3 has the function of serving as the HTTP server and communicates with the client program server 1 using a SOAP message. The UDDI registry 4 has the function of serving as the HTTP server and communicates with the client program server 1 using the SOAP message.

The client program server 1 includes a display 6, a data input unit 7 such as a keyboard, a CPU 8, a memory 9 and a database 10 in which the WSDL files not revised and revised are stored. A change management program 72 is stored in the memory 9. The change management program 72 includes development environment software 70 and execution environment software 71. The execution environment software 71 includes an HTTP server program 24, a client program 25, a client program execution program 26, an access request error detection program 27 and a program error occurrence portion detection program 28. The development environment software 70 includes an error avoidance client program production program 29.

The user computer 2 includes a display 11, an input unit 12, a CPU 13 and a memory 14. A Web browser program 31 is stored in the memory 14.

The Web service server 3 includes a display 15, an input unit 16, a CPU 17, a memory 18 and a database 30. An HTTP server program 32 and a Web service program 33 are stored in the memory 18. The Web service server 3 preserves an unrevised WSDL file 36 and a revised WSDL file 37 in the database 30.

The UDDI registry 4 includes a display 19, an input unit 20, a CPU 21, a memory 22 and a database 23. An HTTP server program 34 and a UDDI program 35 are stored in the memory 22. Further, the UDDI registry 4 preserves WSDL file storage location information 51 of each Web service server in the database 68.

2. Outline of Automatic Change and Replacement of Client Program

Description is now made to the summarized flow of revision of the interface definition information by the Web service server 3 and automatic change and replacement of the client program by the client program server 1.

(1) In the Web service server 3, the interface definition information is revised and the server program is changed in accordance with a new interface.

(2) The Web service server 3 re-registers a storage location of the revised interface definition information in the UDDI registry 4.

(3) The user computer 2 utilizes the Web service through the client program server 1.

(4) The client program in the client program server 1 transmits a request message to the Web service server 3. However, the client program is prepared in accordance with the unrevised interface definition information and accordingly a new server program is not fit to the unrevised interface definition information, so that an error is returned to the client program.

(5) The client program server 1, when it is confirmed that the error indicates mismatch of the interface definition information, stops the client program temporarily. On the other hand, the client program server 1 causes the user computer 2 to display the message such as "Error is detected. Wait a moment".

(6) The client program server 1 accesses to the UDDI registry 4 to obtain the revised interface definition information of the Web service server 3 and compares it with the unrevised interface definition information.

(7) The client program server 1 extracts portions related to the change of the interface from source codes of modules constituting the client program and changes the portions to be fit to the revised interface definition information.

(8) The client program server 1 converts the source codes of the modules constituting the client program into an executable form to replace the current client program thereby.

(9) The client program server 1 causes the user computer 2 to display the message so that input for utilization of the Web service is made again.

(10) The replaced client program transmits the request message to the Web service server 3 in response to a request from the user.

3. Structure of Client Program

FIG. 2 schematically illustrates the client program 25 executed by the program client server 1 of the embodiment. The program 25 includes a control program 38, an operation processing program 39, a display program 40, an adapter program 41, a SOAP client program 42 and a WSDL stub program 43.

The user computer 25 transmits a request to the client program 25. The client program 25 transmits an access request to the Web service server 3 and receives a processing result. The client program 25 causes the user computer 2 to display the processing result.

The processing in the client program 25 at this time is now described in detail.

Contents of text input items supplied to the user computer 2 from the Web browser program 31 are transmitted to the client program 25 as an HTTP request 25_1 and the request is received by the control program 38. This request is sent to the operation processing program 39 as a processing request 25_2. The operation processing program 39 requests the adapter program 41 to make processing while supplying the request as argument as shown by 25_3. The adapter program 41 takes out the contents of the text input items of the request and executes a method of the SOAP client program 42 and uses the WSDL stub program 43 to transmit an access request to the Web service server 3 to thereby utilize the Web service.

When the Web service server 3 receives the access request, the Web service server 3 returns a return value as a result 25_4. The return value is stored through the WSDL stub program 43, the SOAP client program 42 and the adapter program 41 to the operation processing program 39. When the control program 38 is notified of the end of processing from the operation processing program 39 as shown by 25_5, the control program 38 makes an output request 25_6 to the display program 40. The display program 40 obtains the return value stored in the operation processing program 39 as shown by 25_7 to thereby receive the result 25_8. The display program 40 displays the received result as a response 25_9 to the Web browser program 31 of the user computer 2.

4. Change of Interface of Web Service Server

Assume that the Web service server 3 includes the Web service program (server program) 33 for registering and managing information such as names, addresses, ages and the like of residents which is resident's basic information for the purpose of explanation.

The Web service server 33 uses the SOAP message as a message for receiving the access request and uses the WSDL for description of the interface definition information. A message tag portion of the current (unrevised) WSDL file 36 described in the WSDL is shown in FIG. 3. Numeral 101 denotes a message tag, which designates "setJukiList" in the name attribute as the definition of a method name for receiving the access request. Numeral 102 denotes a part tag, which designates "Name" in the name attribute as the definition of argument of the setJukiList method and designates "string" in the type attribute as the type definition thereof. Numerals 103 and 104 also represent the string type similarly and designate Address variable and Age variable, respectively.

In order for the manager of the Web service server 3 to make contents of the resident's basic information more satisfactory, it is assumed that the argument of the registration function of the Web service program 33 is increased by one to add the date of birth. Accordingly, the manager revises the WSDL file and stores it in the server. Further, the manager re-registers the storage location information of the revised WSDL file 37 in the UDDI registry 4.

FIG. 4 shows a message tag portion of the revised WSDL file 37. A part tag 105 is added to be revised as compared with the unrevised WSDL file 36. The part tag 105 includes "Birthday" designated as the name attribute and "string" designated as the type attribute.

5. Revision of Client Program

Figure 15:
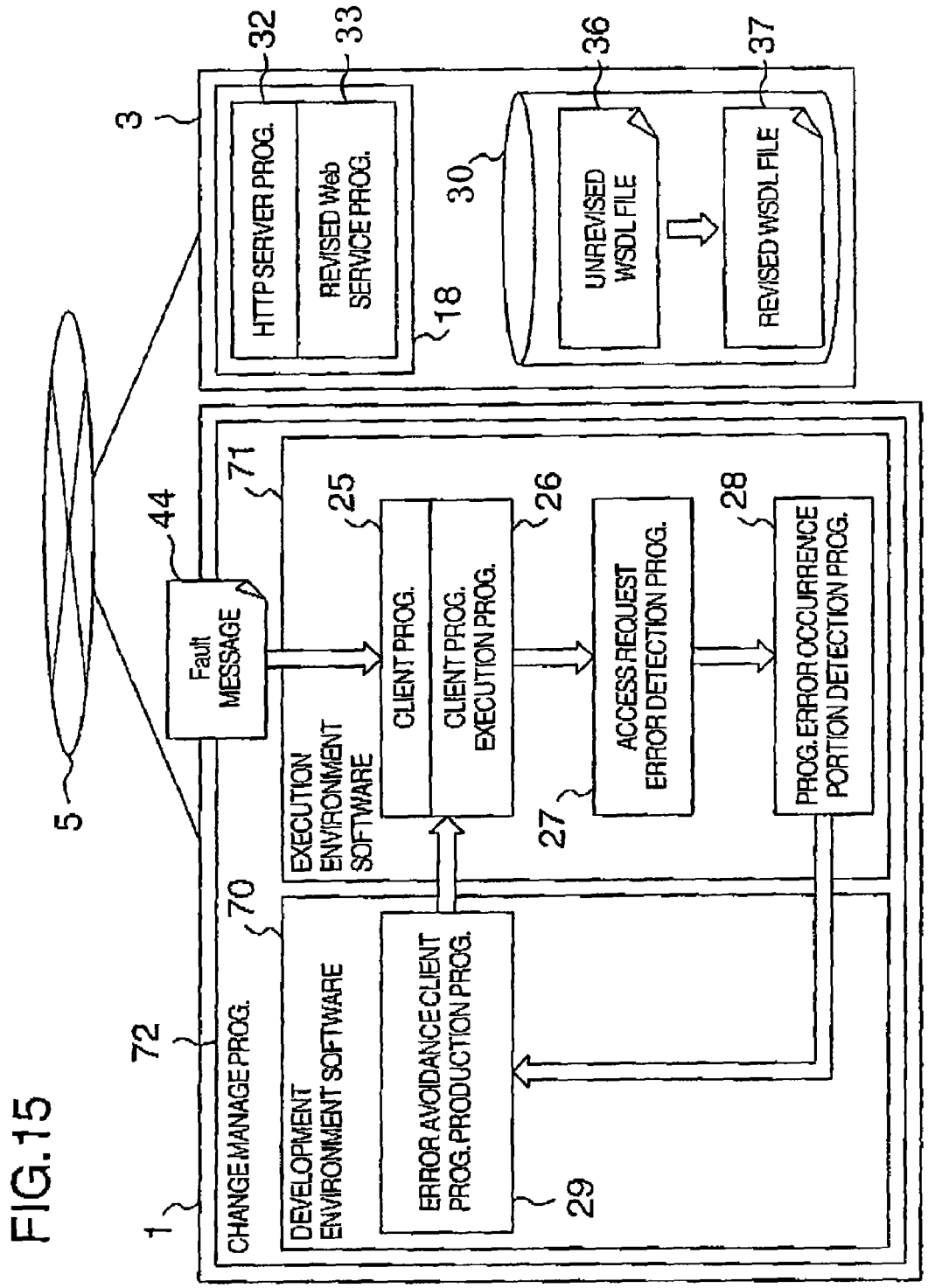
FIG. 15 schematically illustrates a method of changing the client program.

Processing of the client program server 1 in case where the interface (WDSL file) of the Web service program 33 of the Web service server 3 is revised is now described. The processing is performed by the change management program 72 and is schematically illustrated in FIG. 15.

When the client program 25 receives a fault message 44 indicating that an error occurs from the Web service server 3, the access request error detection program 27 is executed and the program error occurrence portion detection program 28, the error avoidance client program production program 29 and the client program execution program 26 are executed successively.

(1) Detection and Analysis of Error

Figure 16:
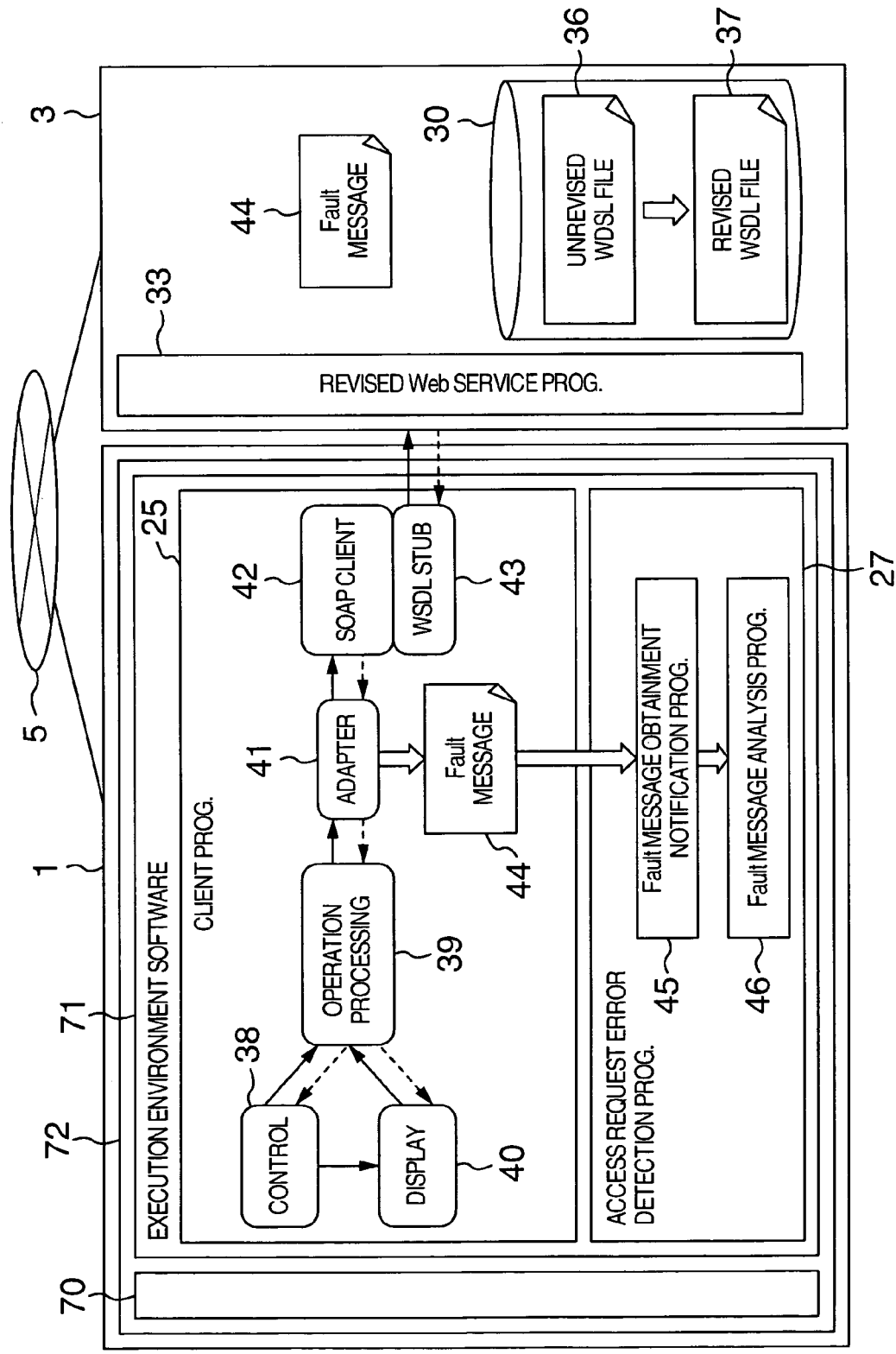
FIG. 16 is a diagram showing the flow of detecting an access request error and analyzing a fault message.

Processing of the client program 25 and the access request error detection program 27 is described with reference to FIG. 16.

When the client program 25 transmits an access request according to the unrevised interface to the Web service server 3 having the revised Web service program 33, a fault message 44 is returned from the Web service server 3 to the client program 25. In the client program 25, the WSDL file 43 receives the fault message 44 and supplies it to the SOAP client program 42. The SOAP client program 42 returns the fault message 44 to the adapter program 41. When the adapter program 41 receives the fault message 44, a fault message obtainment notification program 45 of the access request error detection program 27 is executed. The adapter program 41 returns the processing result to the operation processing program 39 on the basis of a return value from the fault message obtainment notification program 45. When the operation processing program 39 receives a result flag from the adapter program 41, the operation processing program 39 notifies the end of processing to the control program 38. The control program 38 which has received the end of processing makes an output request to the display program 40. The display program 40 which has received the output request obtains the processing result of the operation processing program 39 and returns a response of notifying detection of the error to the Web browser program of the user computer 2.

The access request error detection program 27 includes the fault message obtainment notification program 45 and a fault message analysis program 46.

Figure 19:
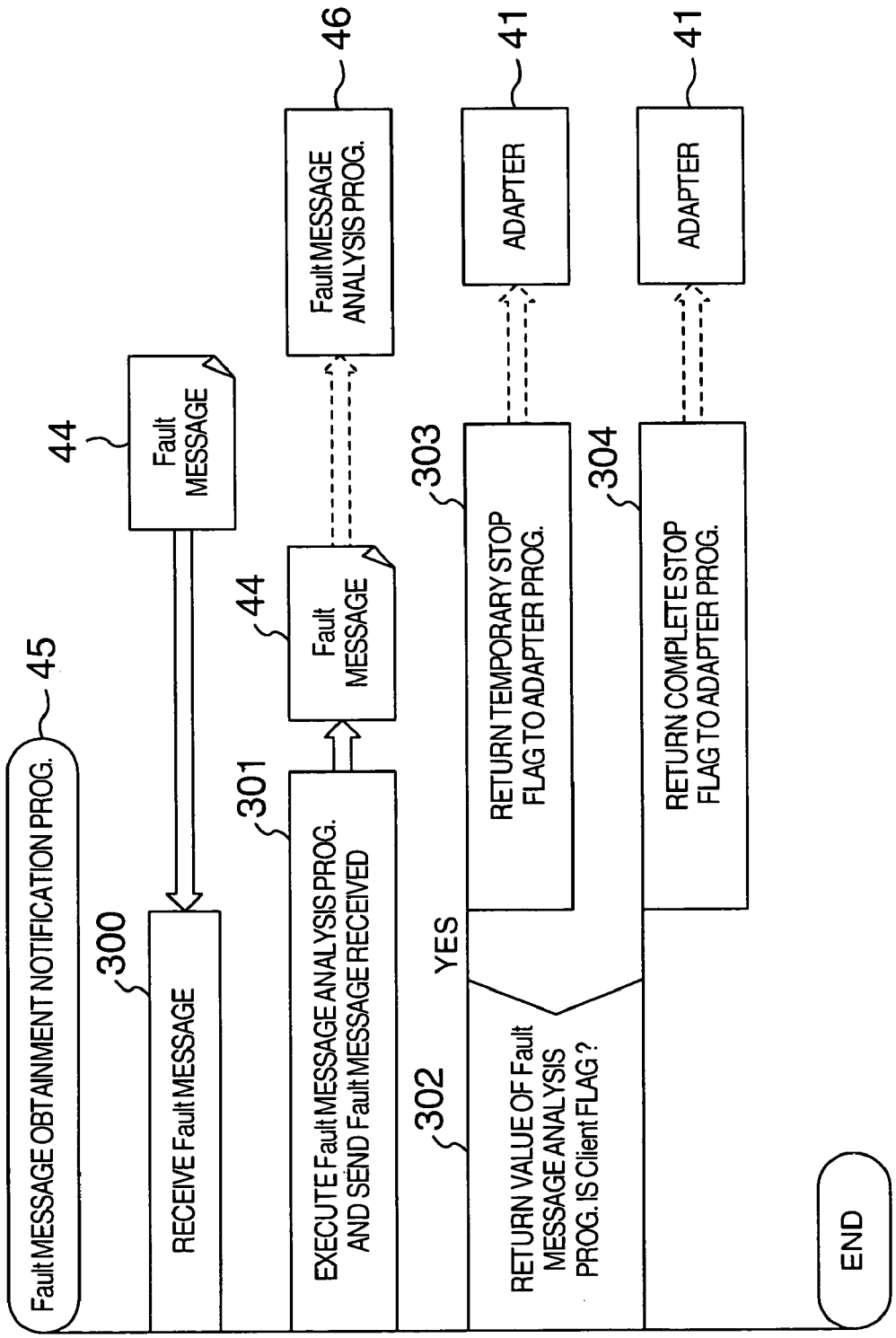
FIG. 19 is a diagram showing the processing flow of the fault message obtainment notification program.

The processing flow of the fault message obtainment notification program 45 is shown in FIG. 19. The fault message obtainment notification program 45 receives a fault message (300). Next, the fault message obtainment notification program 45 causes the fault message analysis program 46 to be executed and sends the fault message 44 thereto (301). The fault message obtainment notification program 45 judges a return value of the fault message analysis program 46 (302). When the return value of the fault message analysis program 46 is a client flag indicating that the cause of error exists on the side of the client program, a temporary stop flag is returned to the adapter program 41 of the client program 25 (303). When the return value is not the client flag, a complete stop flag is returned to the adapter program 41 (304).

Figure 20:
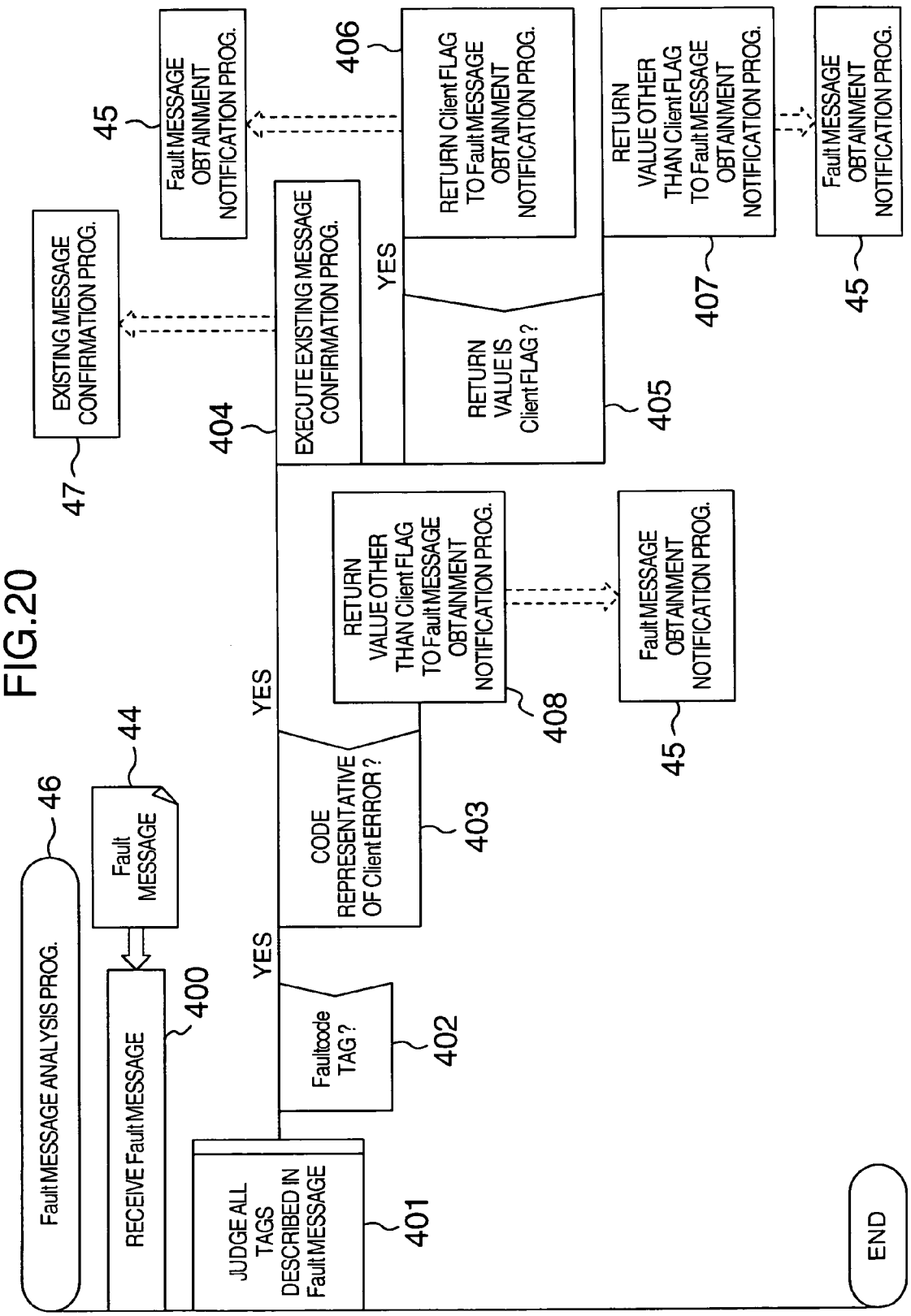
FIG. 20 is a diagram showing the processing flow of the fault message analyzing program.

The processing flow of the fault message analysis program 46 is shown in FIG. 20. The fault message analysis program 46 analyzes the received fault message 44 (400). The fault message analysis program 46 judges all tags described in this message as follows (401). The fault message analysis program 46 finds out a faultCode tag from all the tags (402) and judges whether a value of this tag is an error code representative of Client error (403). When it is the error code representative of Client error, an existing message confirmation program 47 of the program error occurrence portion detection program 28 is executed (404). When a return value of the existing message confirmation program 47 is the Client flag (405), the Client flag is returned to the fault message obtainment notification program 45 (406) and when it is not the Client flag, information other than the Client flag is returned to the fault message obtainment notification program 45 (407). When it is not the error code representative of the Client error in 403, information other than the Client flag is returned to the fault message obtainment notification program 45 (408).

Figure 17:
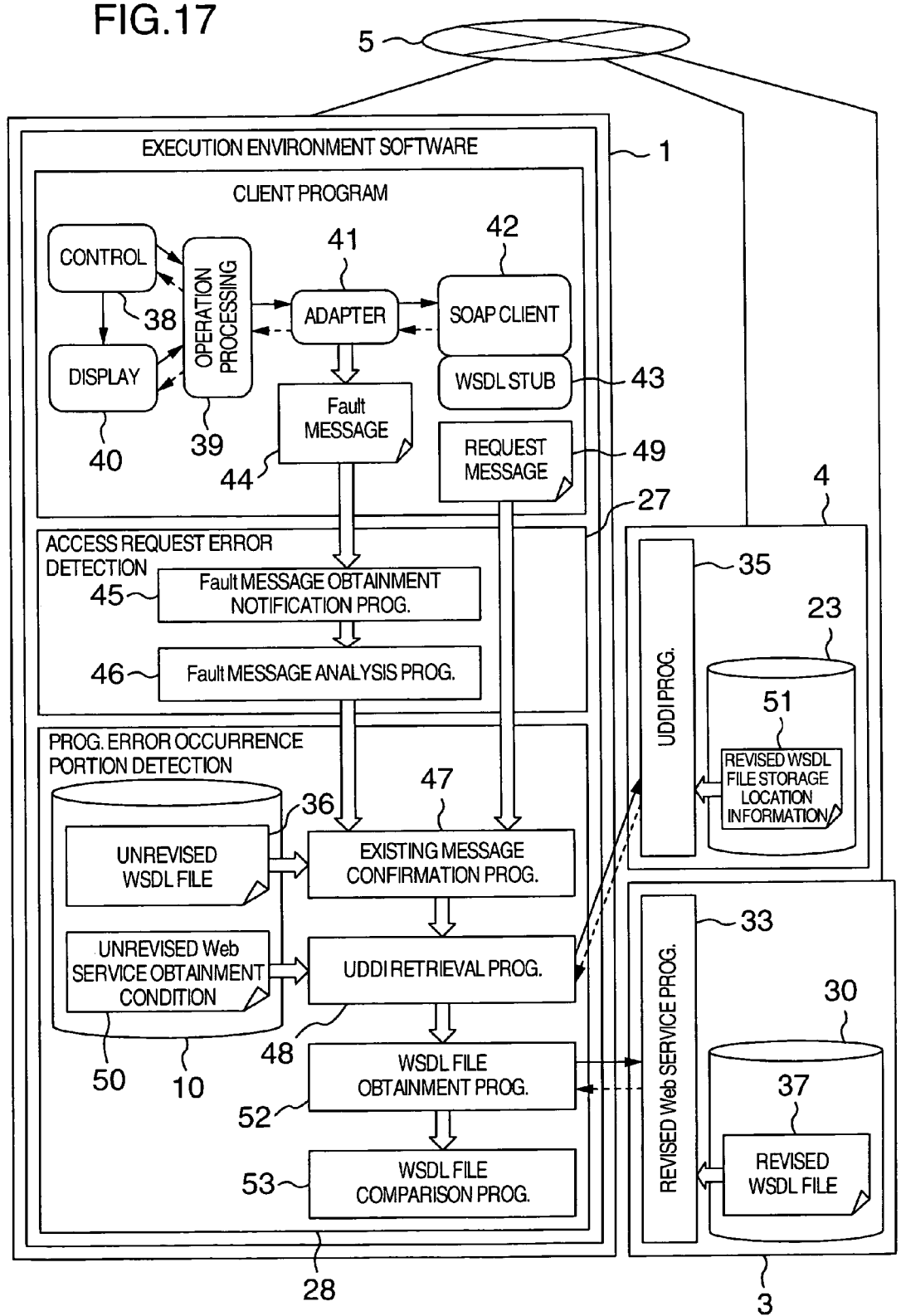
FIG. 17 is a diagram showing the flow of obtaining the revised WDSL file and detecting an error occurrence portion in the program.

The processing procedure of the program error occurrence portion detection program 28 is shown in FIG. 17. The program error occurrence portion detection program 28 includes the existing message confirmation program 47, a UDDI retrieval program 48, a WSDL file obtainment program 52 and a WSDL file comparison program 53.

Figure 21:
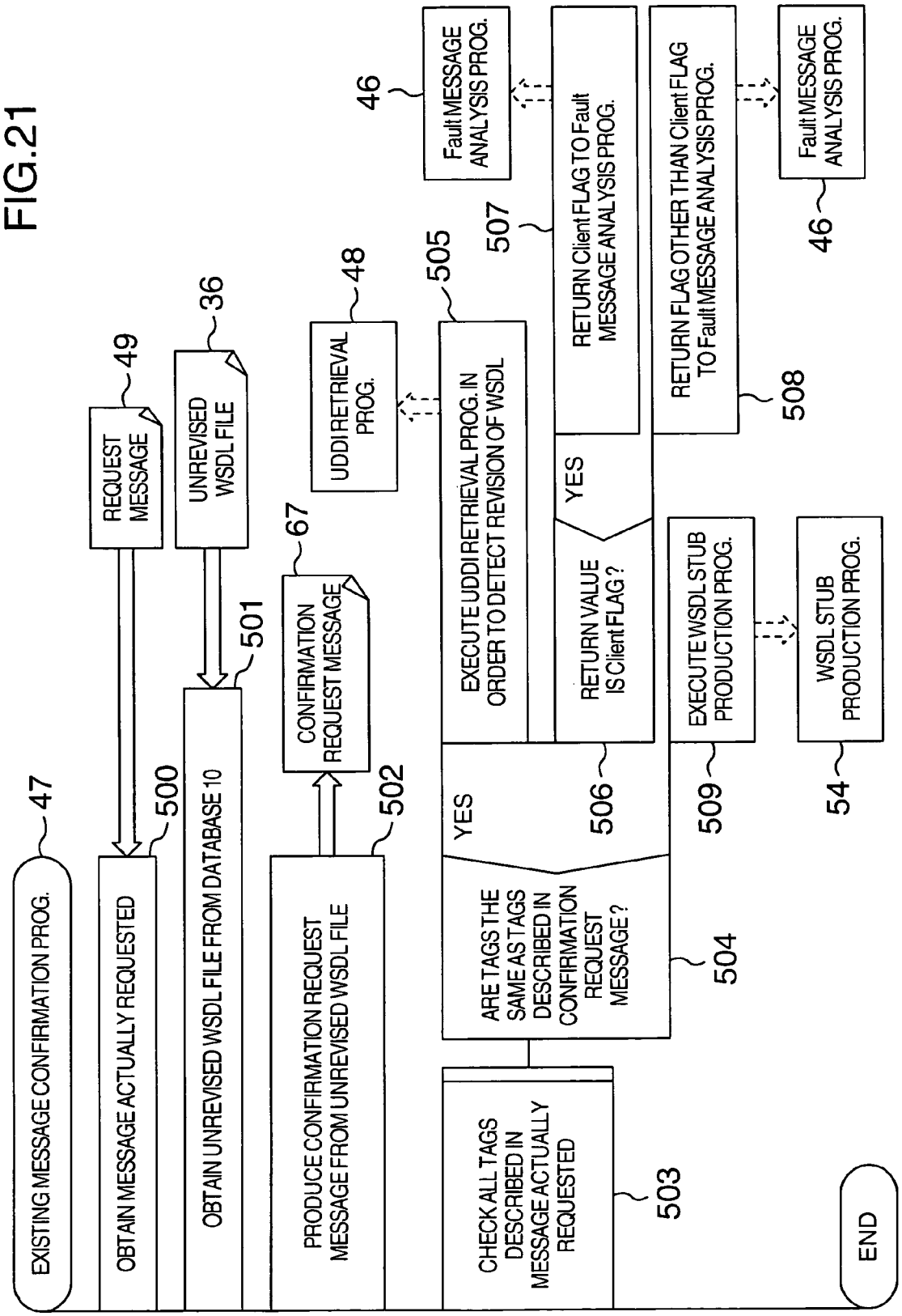
FIG. 21 is a diagram showing the processing flow of an existing message conforming program.

The processing flow of the existing message confirmation program 47 is shown in FIG. 21. Generally, the client program 25 stores the request messages transmitted to the Web service server 3 in the past for a fixed period or by a fixed number. The existing message confirmation program 47 takes out the request message 49 that made an error from the storage location (500). The existing message confirmation program 47 takes out the unrevised WSDL file 36 from the database 10 in the client program server 1 (501) and produces a confirmation request message 67 for confirming basic operation using the unrevised WSDL file 36 (502). The existing message confirmation program 47 judges whether all tags of the taken-out request message 49 (503) are the same as tags of the produced confirmation request message 67 or not (504).

When the tags are the same, the existing message confirmation program 47 judges that the interface of the Web server program is revised and executes the UDDI retrieval program 48 in order to obtain new interface definition information (WSDL file) (505). The existing message confirmation program 47 judges a return value of the UDDI retrieval program 48 executed in step 505 (506). When the return value is a Client flag, the existing message confirmation program 47 returns the Client flag to the fault message analysis program 46 (507). When it is not the Client flag, the existing message confirmation program 47 returns information other than the Client flag to the fault message analysis program 46 (508). On the other hand, in step 504, when the tags are not the same, the existing message confirmation program 47 sends the unrevised WSDL file 36 to the WSDL stub production program 54 (509).

Figure 22:
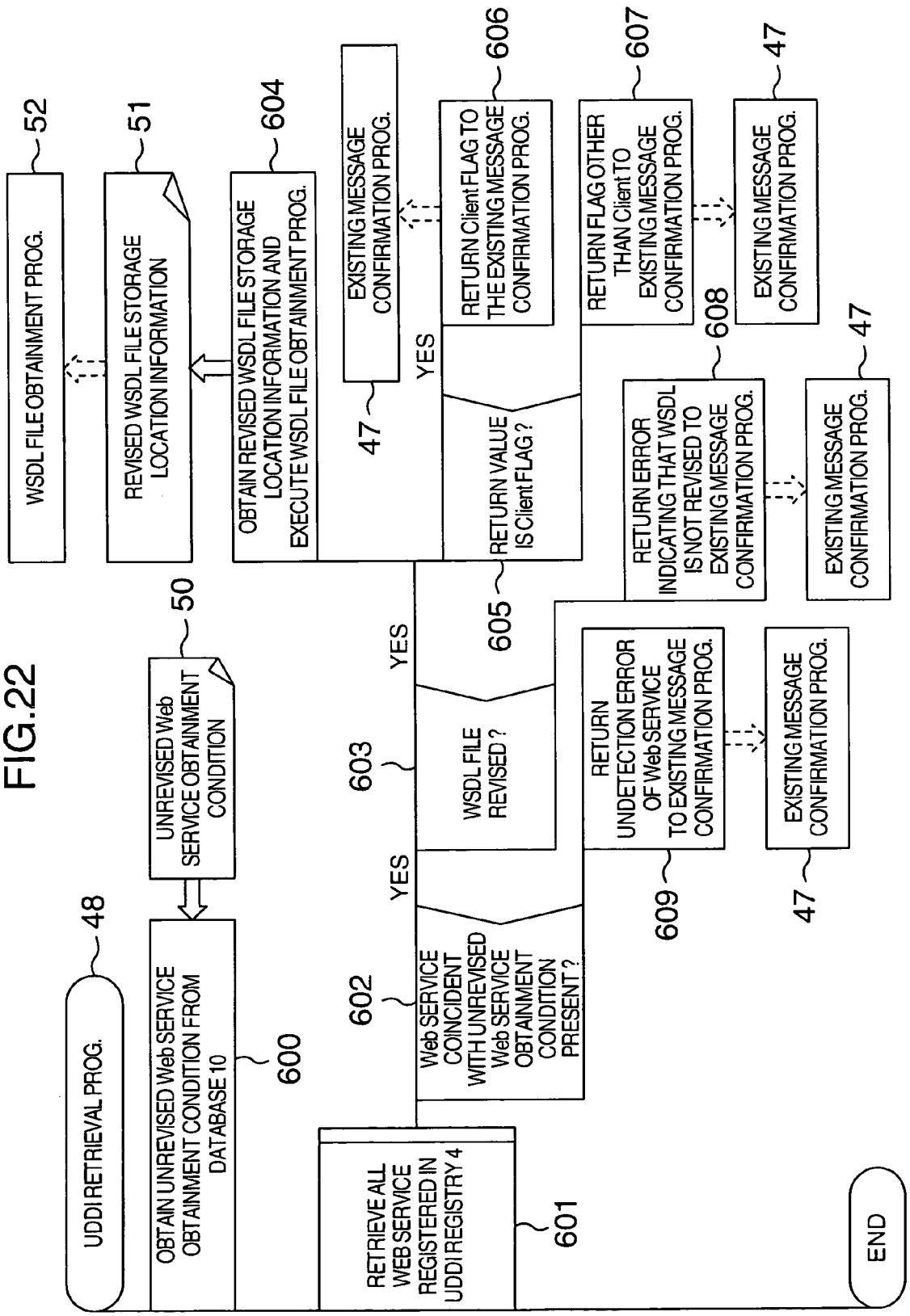
FIG. 22 is a diagram showing the processing flow of a UDDI retrieval program.

The processing flow of the UDDI retrieval program 48 is shown in FIG. 22. The UDDI retrieval program 48 takes out the Web service obtainment condition 50 used in the past retrieval from the database 10 (600) and retrieves the Web service by the UDDI registry 4 on the basis of this condition. When the UDDI retrieval program 48 retrieves all the Web service (601) and can detect the Web service coincident with the unrevised Web server obtainment condition 50 (602), the UDDI retrieval program 48 judges whether the WSDL file storage location information is revised or not (603).

When the WSDL file storage location information is revised, the UDDI retrieval program 48 obtains the revised WSDL file storage location information 49 registered in the UDDI registry 4 (604) and sends it to the WSDL file obtainment program 52. The UDDI retrieval program 48 judges the return value of the WSDL file obtainment program 52 (605) and when it is the Client flag, the UDDI retrieval program 48 returns the Client flag to the existing message confirmation program 47 (606). When it is not the Client flag, the UDDI retrieval program 48 returns information other than the Client flag to the existing message confirmation program (607). When the WSDL file storage location information is not revised in step 603, the UDDI retrieval program 48 returns an error indicating that WSDL is not revised to the existing message confirmation program 47 (608). When the Web service coincident with the unrevised Web service obtainment condition 50 cannot be detected in step 602, the UDDI retrieval program 48 returns an undetection error of Web service to the existing message confirmation program 47 (609).

Figure 23:
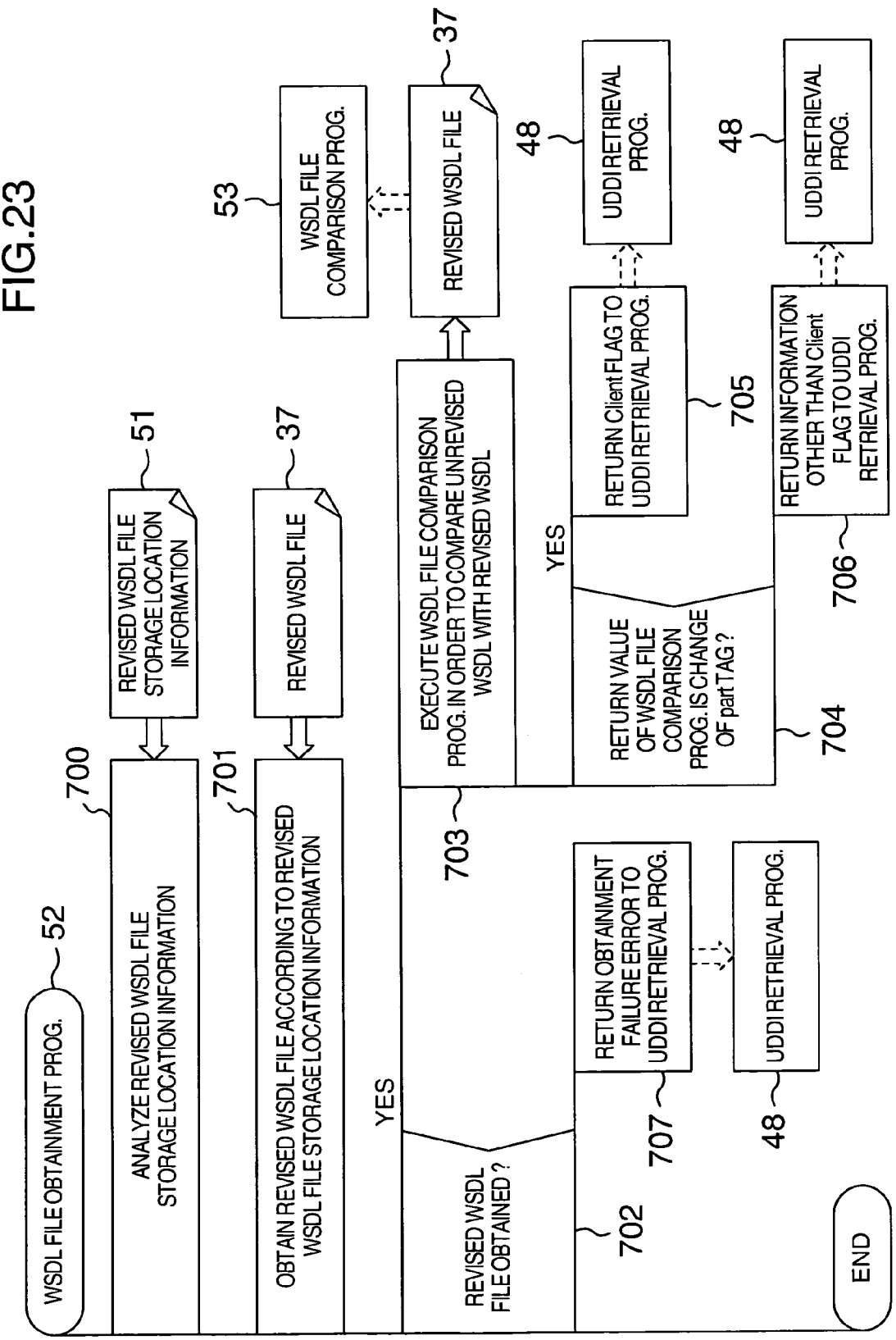
FIG. 23 is a diagram showing the processing flow of a WDSL file obtainment program.

The processing flow of the WSDL file obtainment program 52 is shown in FIG. 23. The WSDL file obtainment program 52 receives the revised WSDL file storage location information 51 from the UDDI retrieval program 48 (700) and obtains the revised WSDL file 37 in accordance with the revised WSDL file storage location information 51(701). Next, the WSDL file obtainment program 52 judges whether the revised WSDL file 37 can be obtained or not (702) and when it can be obtained, the WSDL file obtainment program 52 sends the obtained revised WSDL file 37 to the WSDL file comparison program 53 to be executed (703). The WSDL file obtainment program 52 judges the return value of the executed WSDL file comparison program 53 (704) and when the return value is change of part tag, the WSDL file obtainment program 52 returns the Client flag to the UDDI retrieval program 48 (705). When it is not the change of the part tag, the WSDL file obtainment program 52 returns information other than the Client flag (706). In step 702, when the WSDL file obtainment program 52 cannot obtain the revised WSDL file 37, the WSDL file obtainment program 52 returns an error indicating that the WSDL file obtainment program 52 fails in obtainment of the revised WSDL file 37 to the UDDI retrieval program 48 (707).

Figure 24:
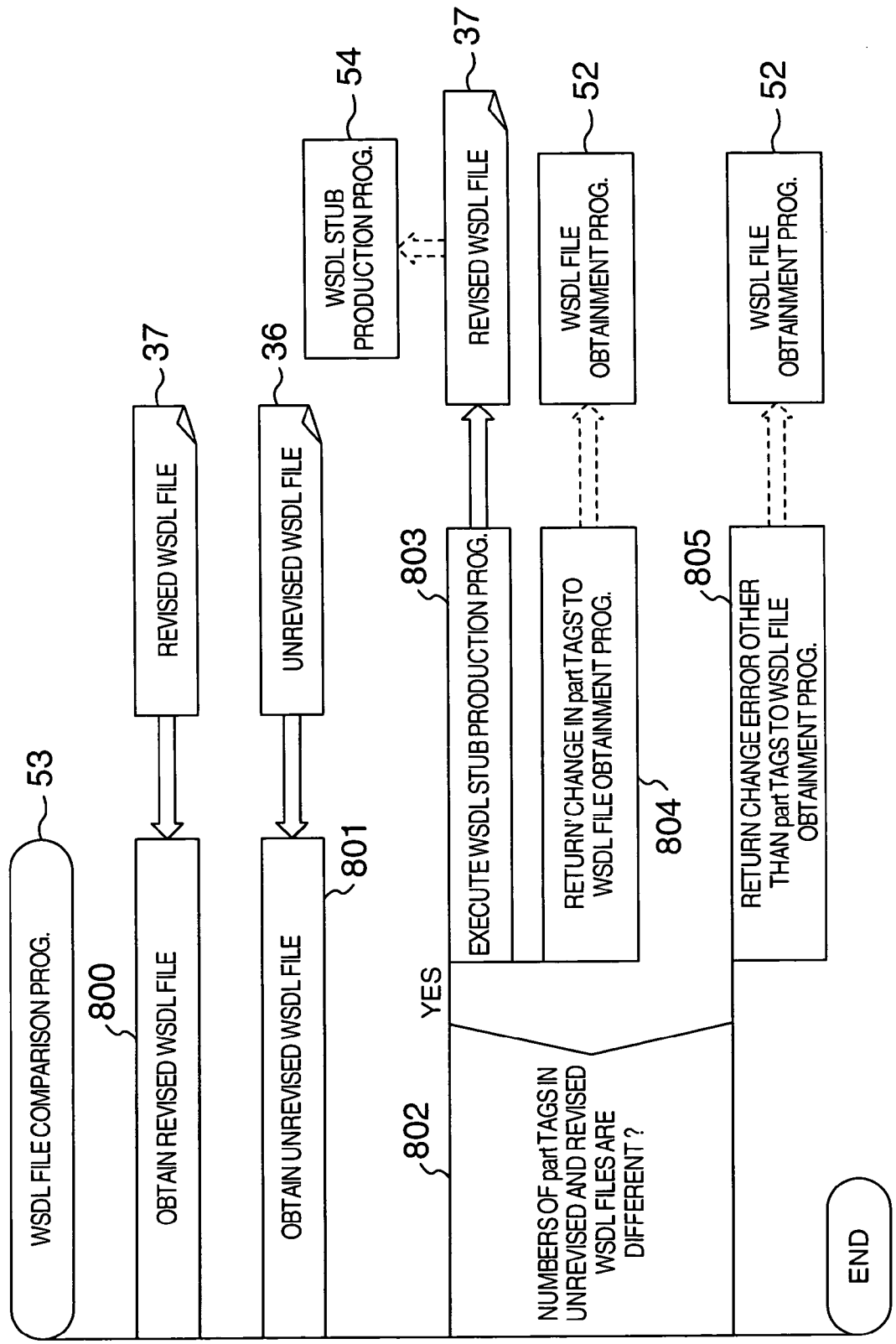
FIG. 24 is a diagram showing the processing flow of a WDSL file comparison program.

The processing flow of the WSDL file comparison program 53 is shown in FIG. 24. The WSDL file comparison program 53 obtains the revised WSDL file 37 (800) and then obtains the unrevised WSDL file 36 (801).

The WSDL file comparison program 53 compares the revised WSDL file 37 with the unrevised WSDL file 36 (802) and when the difference portion therebetween is increase or decrease in part tags which are child elements of the message tags in the WSDL file, the WSDL file comparison program 53 controls to execute the WSDL stub production program 54 of the error avoidance client program production program 29 and sends the revised WSDL file 37 thereto (803). Thereafter, the WSDL file comparison program 53 returns the changed part tags to the WSDL file obtainment program 52 (804). When the judgment result of 802 is change other than the increase or decrease in the part tags, the WSDL file comparison program 53 returns an error indicating the change other than the increase or decrease in the part tags to the WSDL file obtainment program 52 (805).

(2) Change of Client Program

Figure 18:
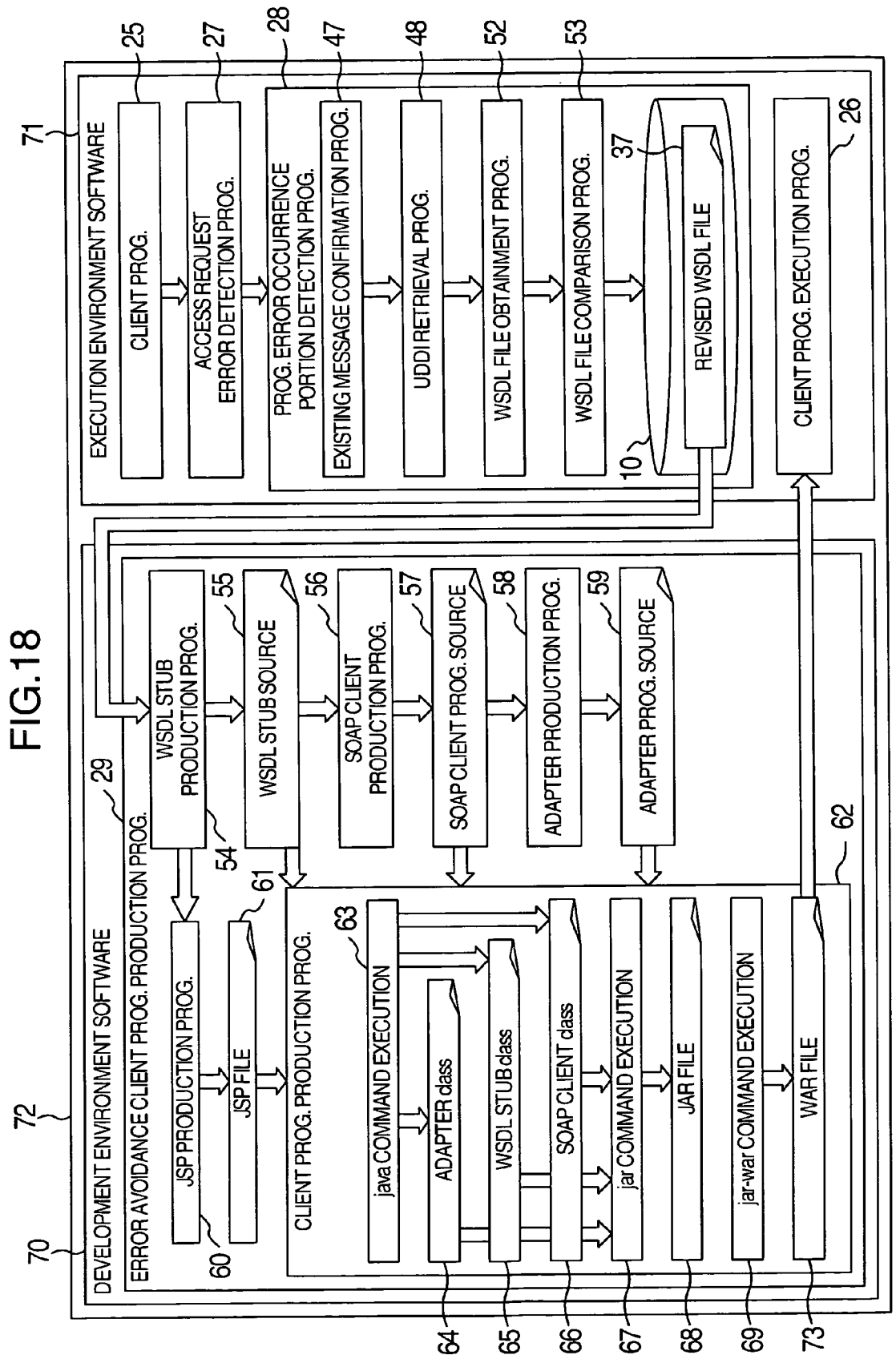
FIG. 18 is a diagram showing the flow of an error avoidance client program for changing the client program to produce it on the basis of the change portion detected by the program error occurrence portion detecting step.

The processing procedure of the error avoidance client program production program 29 shown in FIG. 18 is now described. The error avoidance client program production program 29 includes the WSDL stub production program 54, an SOAP client production program 56, an adapter production program 58, a JSP production program 60 and a client program production program 62.

Figure 25:
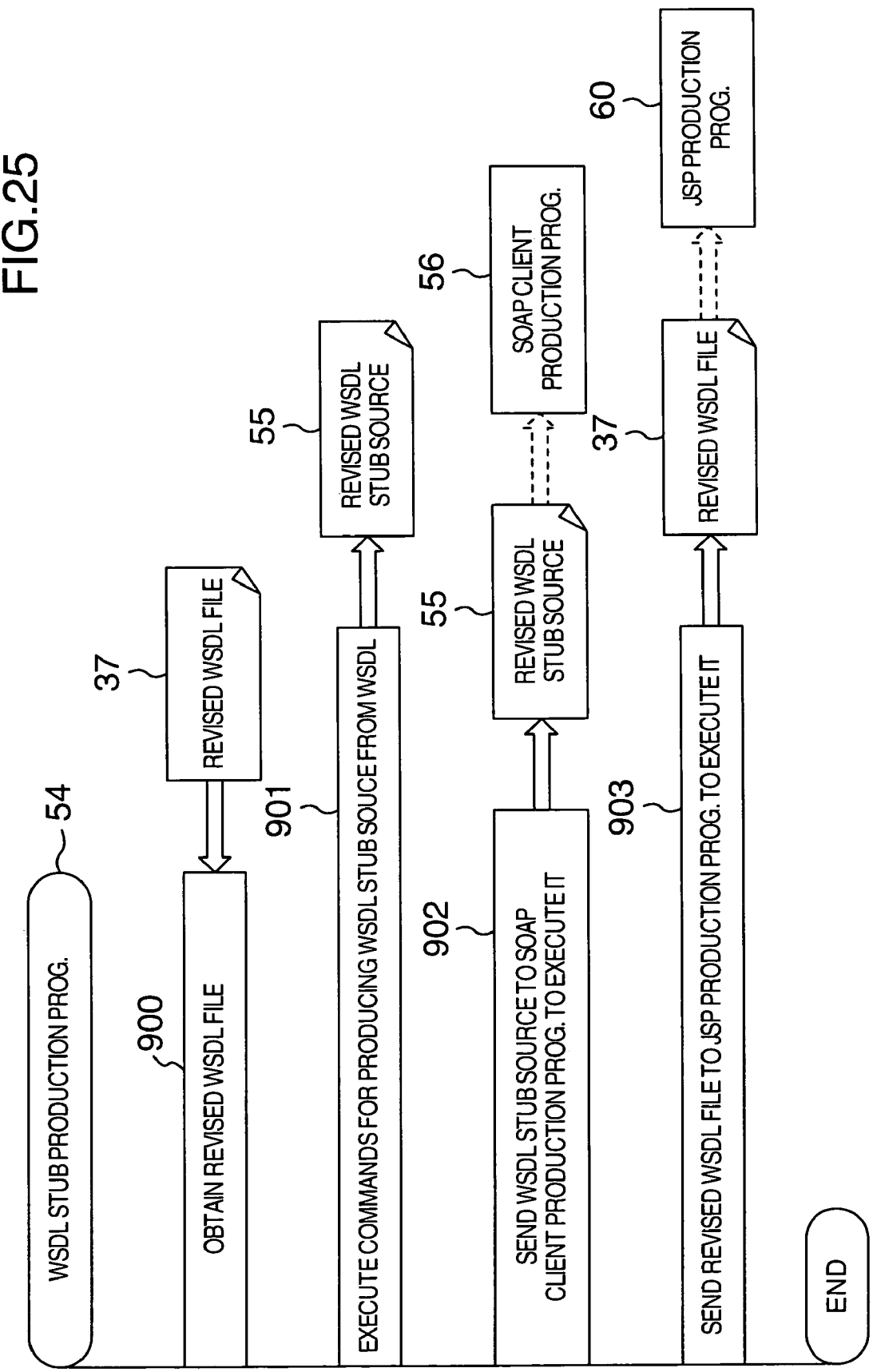
FIG. 25 is a diagram showing the processing flow of a WDSL stub production processing program.

The processing flow of the WSDL stub production program 54 is shown in FIG. 25. The WSDL stub production program 54 receives the revised WSDL file 37 (900) and executes commands for producing WSDL stub source 55 (901). The WSDL stub production program 54 sends the WSDL stub source 55 to the SOAP client production program 56 to execute it (902). Next, the WSDL stub production program 54 sends the revised WSDL file 37 to the JSP production program 60 to execute it (903).

Figure 26:
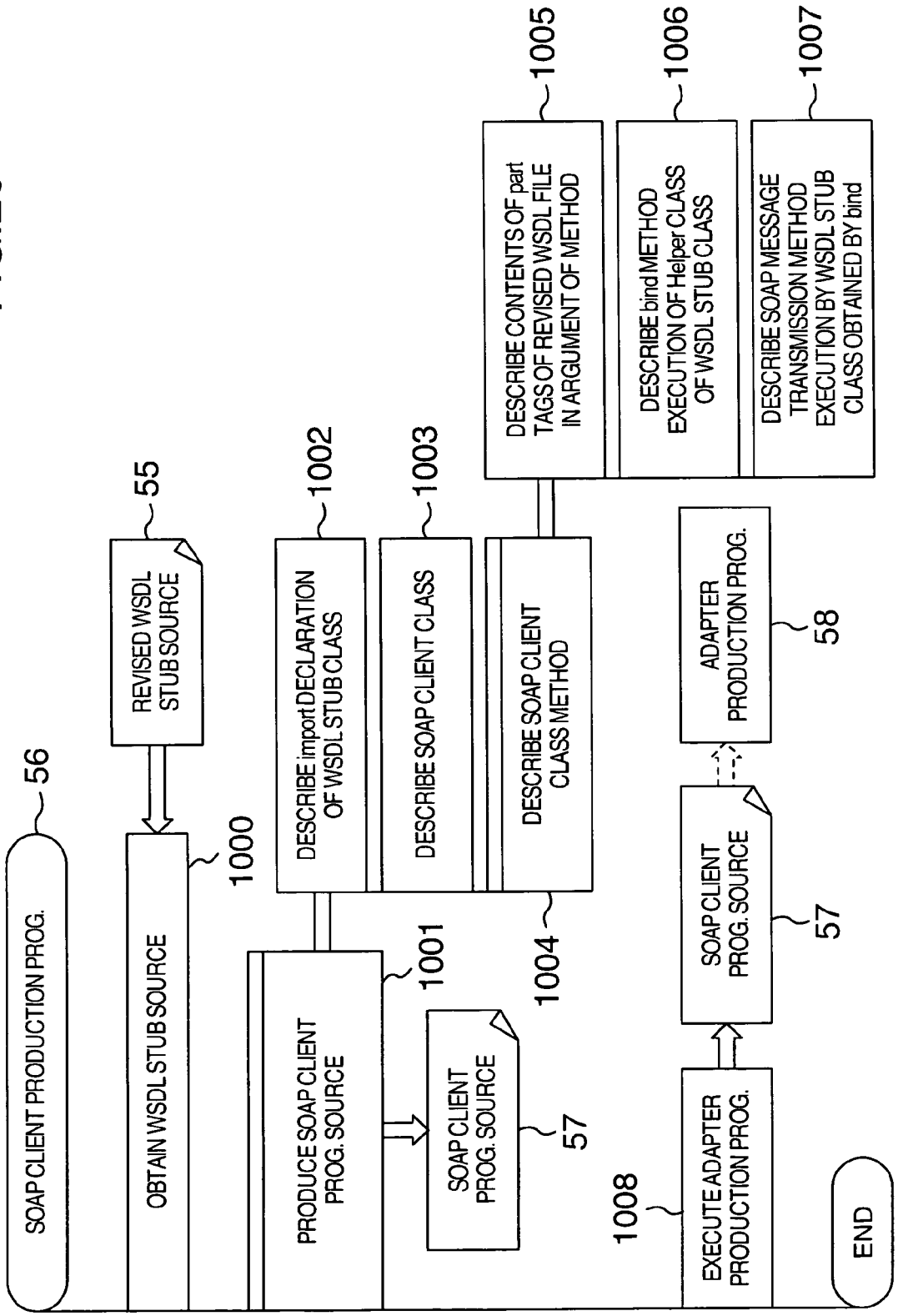
FIG. 26 is a diagram showing the processing flow of a SOAP client production program.

The processing flow of the SOAP client production program 56 is shown in FIG. 26. The SOAP client production program 56 receives the WSDL stub source 55 (1000). The SOAP client production program 56 uses the WSDL stub source 55 to produce the SOAP client program source 57 (1001). The production of the SOAP client program source 57 is made in steps 1002 to 1007 in detail. The SOAP client production program 56 sends the produced SOAP client program source 57 to the adapter production program 58 (1008).

Figure 27:
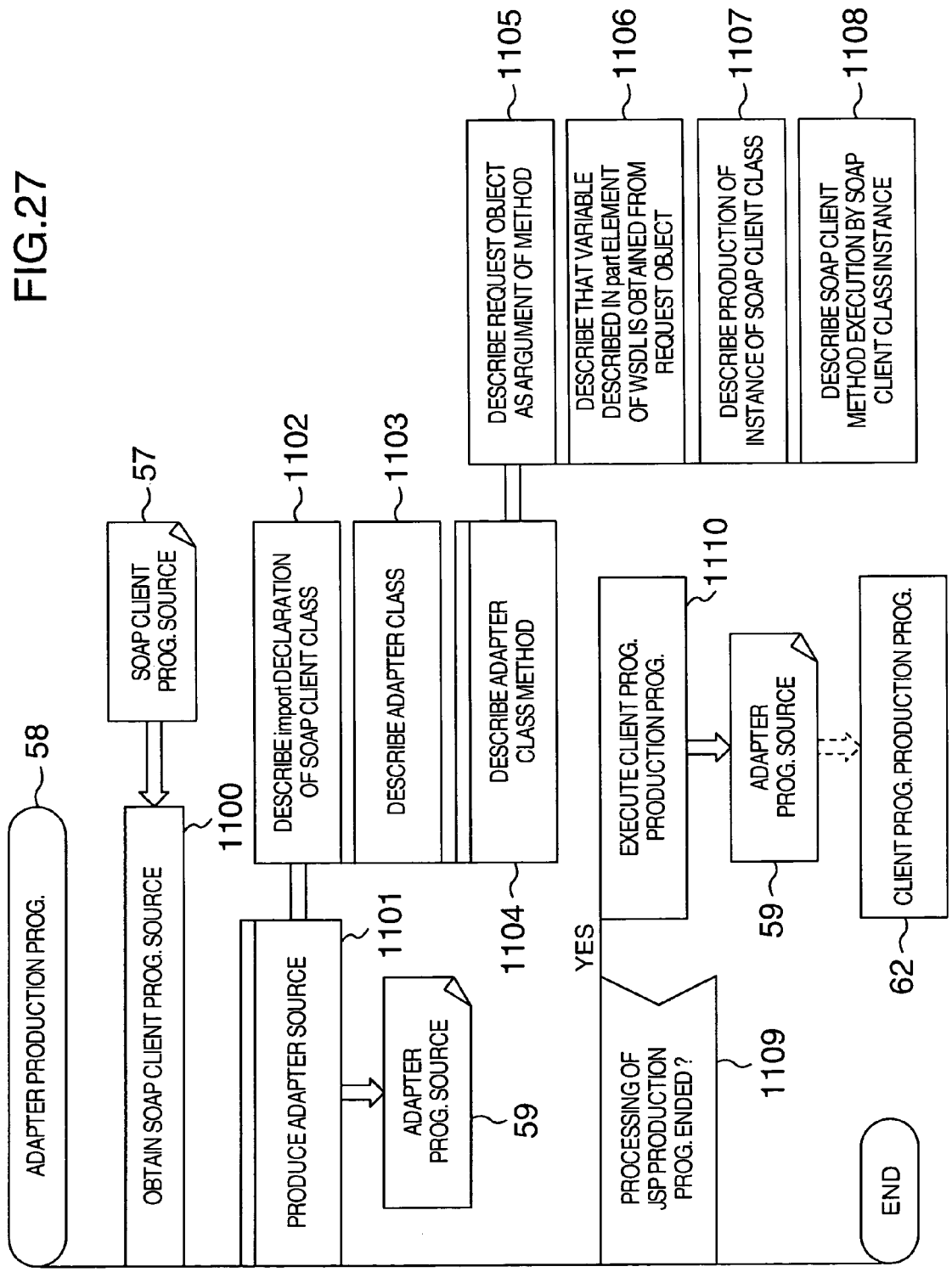
FIG. 27 is a diagram showing the processing flow of an adapter production program.

Next, the processing flow of the adapter production program 58 is shown in FIG. 27. The adapter production program 58 receives the SOAP client program source 57 (1100) and produces the adapter program source 59 from the received SOAP client program source 57 (1101). The production of the adapter program source 59 is made in steps 1102 to 1108 and its produced result is shown in FIG. 14. The adapter production program 58 judges whether the processing of the JSP production program 60 executed in step 903 of FIG. 25 is ended or not (1109) and sends the adapter program source 59 to the client program production program 62 to execute it (1110).

Figure 28:
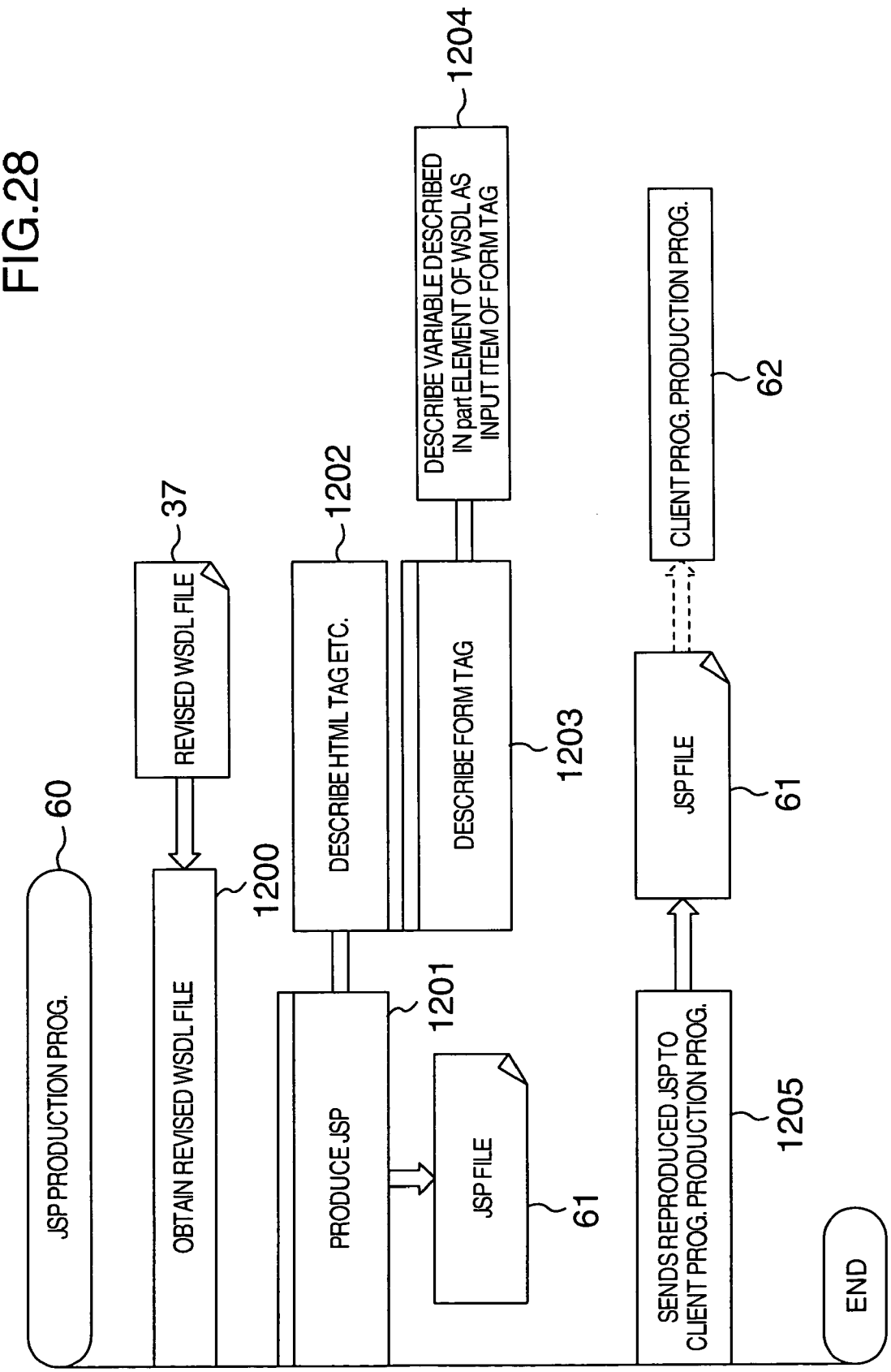
FIG. 28 is a diagram showing the processing flow of a JSP production program.

The processing flow of the JSP production program 60 is shown in FIG. 28. The JSP production program 60 receives the revised WSDL file 37 (1200). The JSP production program 60 produces a JSP file 61 having an argument portion of the message tag of the revised WDSL file 37 as an input item (1201). The production of the JSP file is shown in steps 1202 to 2304 in detail. The JSP production program 60 sends the produced JSP file 61 to the client program production program 62 to execute it (1205).

How the sources of the related programs are revised by the above production programs is described by a concrete example. This is the example that the WSDL file 36 (FIG. 3) is revised to the WSDL file 37 (FIG. 4).

The WSDL stub program 43 is produced from the WSDL file 36. FIG. 9 shows source codes of the WSDL stub program produced from the unrevised WSDL file 36 (FIG. 3). Numeral 2010 represents the package declaration of the WSDL stub program. It means that the package has the package name of jp.co.Ohtake.wsdl and each class is produced in this package. Numeral 2020 represents the interface declaration of JukiList_Service declaring that setJukiList of 2030 is provided as method. Further, in 2030, it is defined that Name, Address and Age of String type are provided as arguments of the method and return value of boolean type is returned. Numeral 2040 represents the end of the definition of 2020.

Numeral 2050 represents the package declaration in the same manner as 2010. Numeral 2060 represents the import declaration of registry.Registry class, 2070 the import declaration of registry.RegistryException class, 2080 to 2150 the definition of JukiList_ServiceHelper class, 2090 and 2120 the definition of the method provided in this class, 2100 the definition of the return value of method of bind() declared in 2090, 2110 the end of the definition of 2090, and 2130 the definition of the return value of the method of bind(String url) declared in 2120.

FIG. 10 shows the source codes 55 of the WSDL stub program produced by the WSDL stub production program 54 from the revised WSDL file 37 shown in FIG. 4. The source codes 55 of FIG. 10 is different from the source codes shown in FIG. 9 in that String type Birthday is added as the argument of the setJukiList method shown in 2030. This is shown by 2160 of FIG. 10.

FIG. 5 shows the unrevised JSP file. The JSP file is related to the display program 40 of the client program 25 and is described in HTML. Numeral 201 represents an HTML tag, 202 a head tag, 203 a title tag, which defines that "resident's basic information input" is displayed in a Web browser title, and 204 a body tag, from which contents displayed in the Web browser are described. Accordingly, a character string of "resident's basic information input" is displayed in the Web browser in accordance with the description of the character string of "resident's basic information input" in 205. Numeral 206 represents a FORM tag inputted by the user computer 2, which defines POST method execution of an http request. Further, SETJUKI is defined as an action type at this time.

Figure 7:
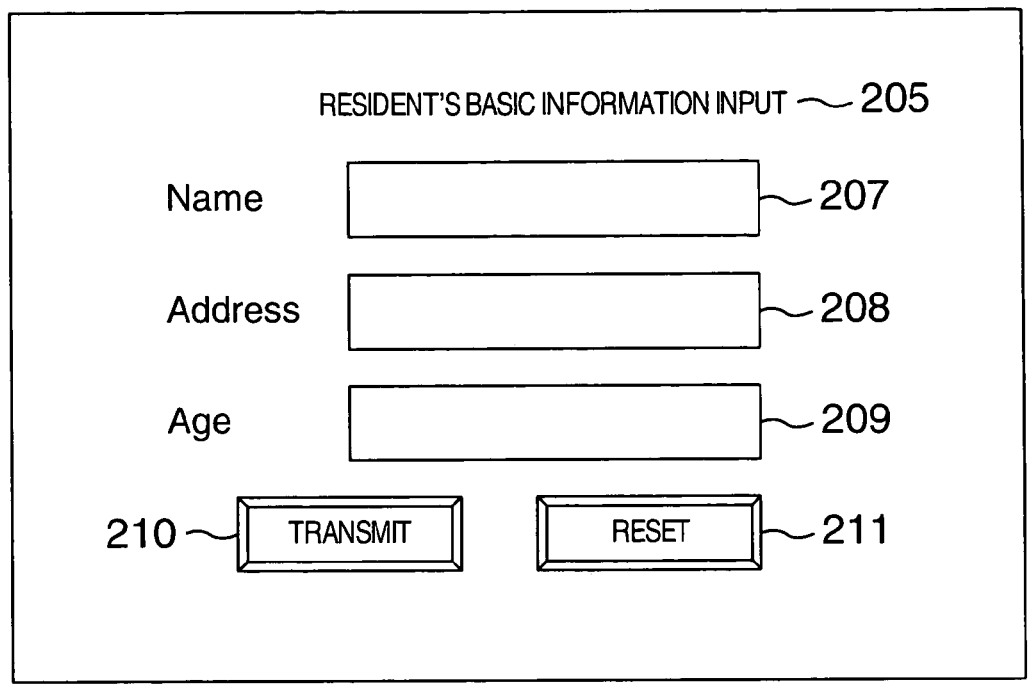
FIG. 7 shows an example of a picture displayed in a user computer of an unrevised client program.

Numerals 207 to 209 represent the definition of contents transmitted by the FORM tag. There are text input items including Name represented in 207, Address in 208 and Age in 209, a submit tag 210 for transmitting information of the input items 207, 208 and 209 and a reset tag 211 for erasing the contents of the text input items. The picture in which the unrevised JSP file is displayed in the Web browser of the user computer 2 is shown in FIG. 7.

Figure 8:
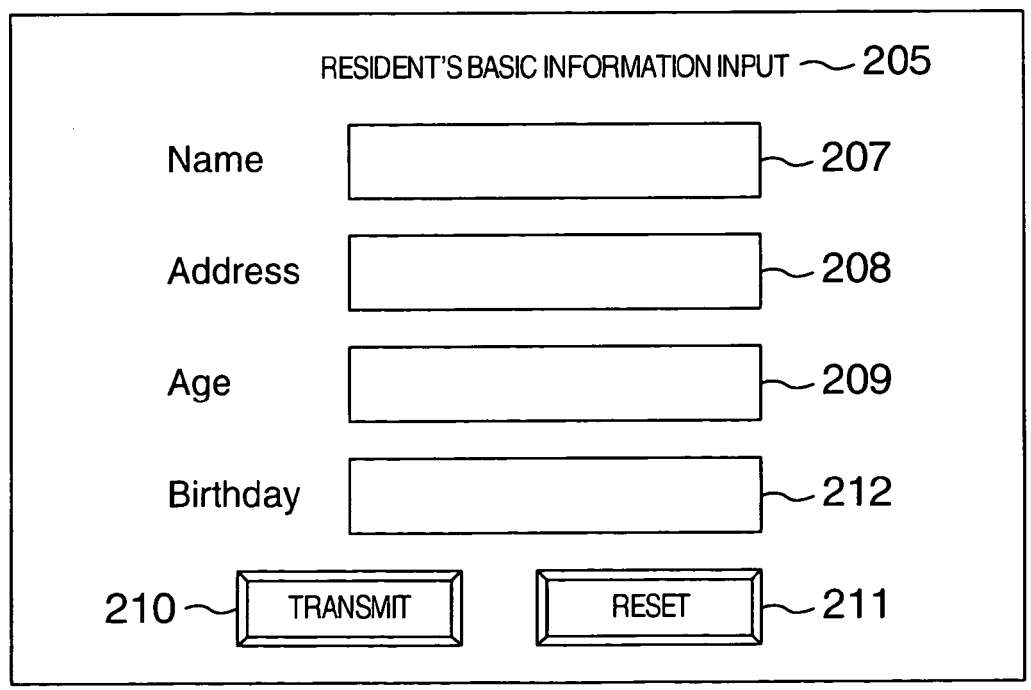
FIG. 8 shows an example of a picture displayed in the user computer of a revised client program.

The contents of the revised JSP file produced by the JSP production program 60 are shown in FIG. 6. Birthday of the text input item 212 is added to the unrevised JSP file to produce the revised JSP file. The picture in which the revised JSP file is displayed in the Web browser of the user computer 2 is shown in FIG. 8.

The relation of the text input items and the part tag of the WSDL file is now described. The text input items of the unrevised JSP file of FIG. 5 have the same items as the arguments described in the part tags which are child elements of the message tags of the unrevised WSDL file 36 shown in FIG. 3. That is, Name represented in 102, Address in 103 and Age in 104 described in the part tag are Name represented in 207, Address in 208 and Age in 209 of the text input items of the JSP file of FIG. 5, respectively.

Source codes of the SOAP client program 42 utilizing the WSDL stub program of FIG. 9 produced from the unrevised WSDL file 36 are shown in FIG. 11. Numeral 3010 represents the package declaration, 3020 to 3070 the definition of Invoke_jukiList class, and 3030 the declaration of method of the Invoke_jukiList class, in which Name, Address and Age of String type are defined as arguments and boolean type is defined as return value. Numeral 3040 represents an instance of JukiList_Service class obtained by using the method bind() of JukiList_ServiceHelper class defined in 2090 to 2110, and 3050 a result obtained by using the method setjukiList defined in 2030 using the instance of the JukiList_Service.

FIG. 13 shows source codes of the SOAP client program utilizing the source codes (FIG. 10) of the WSDL stub program produced from the revised WSDL file 37. The source codes are produced by the SOAP client production program 56 and are different from FIG. 11 in that Birthday of String type is added to argument of the method in 3080 and Birthday of String type is added to argument of the method in 3090.

FIG. 12 shows source codes of the adapter program 41 utilizing the SOAP client program of FIG. 11. The adapter program 41 makes the package declaration of jp.co.Ohtake.adapter in 4010. All of jp.co.Ohtake.adapter packages are imported in 4020 and all of javax.servlet.http packages are imported in 4030. In 4040 to 4150, adp_Invoke_jukiList class is defined. In 4050 to 4140, the method definition of this class is made. The method adp_setjuki has the return value of Boolean type and the argument of HttpServletRequest type request.

In 4060, initialization of variable adp_rtn for the return value is made in false. In 4070 to 4090, values held by request variable are taken out to be written in adp_name, adp_address and adp_age, respectively. In 4100, the instance of the class defined in 3020 is produced. In 4120, the method setjuke is executed by the instance and its result is written in adp_rtn.

FIG. 14 shows source codes of the adapter program for utilizing the SOAP client program shown in FIG. 13 and the source codes are produced by the adapter production program 58. The source codes are different from those of FIG. 12 in 4160 and 4170. In 4160, a value is taken out from request variable and written in adp_birthday of String type variable. In 4170, argument adp_birthday of the method setjuki to be executed is increased.

(3) Replacement of Client Program

The processing of the client program production program 62 is now described. The client program production program 62 receives the WSDL stub source 55, the SOAP client program source 57, the adapter source 59 and the JSP file 61 from the production programs 54, 56, 58 and 60. Then, the WSDL stub source 55, the SOAP client program source 57 and the adapter source 59 received are compiled by means of javac commands 63 to produce class files. The produced class files 64, 65, 66 are converted into a JAR file 68 of jar file format by means of jar commands 69. Next, the JAR file 68 and the JSP file 61 are converted into a WAR file 73 of war file format by means of war option of the jar commands. Finally, the WAR file 73 is sent to the client program execution program 26.

The client program execution program 26 stops the client program 25 using the WAR file based on the unrevised WSDL file 36 and arranges the client program using the WAR file 73 received from the client program production program 62 to be executed. Further, the client program execution program 26 notifies resumption of the service to the user computer 2.

6. Modifications

In the embodiment, the user computer 2 utilizes the Web service through the client program server 1. The program management method according to the present invention can be also applied to the system having the configuration in which the respective user computers 2 have the client program.

In the embodiment, the UDDI registry 4 manages the storage location of the WSDL file, although the UDDI registry 4 may manage other items such as, for example, the version of the WSDL file and date of registration together therewith. The UDDI retrieval program detects revision by means of actual management items of the UDDI registry.

It should be further understood by those skilled in the art that the foregoing description has been made on embodiments of the invention and that various changes and modifications may be made in the invention without departing from the spirit of the invention and the scope of the appended claims.

What is claimed is:

1. A method of changing a client program corresponding to a computer, comprising the steps of:
   transmitting an access request from the client program to a server program;
   when an error occurs, analyzing a cause of the error, wherein said step of analyzing a cause of the error is made by analyzing contents of a message received from said server program when the error occurs;
   detecting a change part of a Web Services Description Language (WSDL) file defining an interface of said server program when the error is analyzed to be caused by change of the WSDL file defining said interface of said server program in the analyzing step;
   deciding a change portion and a changing scheme of said client program related to said change of said WSDL file defining said interface to change said client program;
   dynamically replacing the client program being currently operated and which transmitted the request in which the error occurred with a changed client program, wherein the client program is changed by at least the following sub-steps:
   a) taking said revised WSDL file in source codes of said client program;
   b) correcting source code portion of said client program related to said detected change part of the WSDL file defining said interface; and
   c) using said corrected source code portion to prepare an executable client program; and
   re-transmitting the access request to the server program from the said changed client program.

2. A client program changing method according to claim 1, wherein
   said detection of said change part of the WSDL file defining said interface is made by comparing an unrevised WSDL file with a revised WSDL file.

3. A client program changing method according to claim 2, wherein
   said decision of said change portion and said changing scheme of said client program is made on the basis of a comparison result of said WSDL files.

4. A method of changing an interface between a client program and a server program in a client/server system, comprising the steps of:
   changing said interface defined by a Web Services Description Language (WSDL) file due to a revision of a server program in a server system;
   registering a changed interface in a location accessible from a client system;
   causing a computer in the client system to perform the following operation including the steps of:
   transmitting an access request to the server program and, when an error occurs, analyzing a cause of the error, wherein said analyzing a cause of the error is made by analyzing contents of a message received from said server program when the error occurs;
   deciding a change part of said interface of the server program when the error is caused by change of a WSDL file defining said interface of the server program;
   deciding a change portion and a changing scheme of the client program related to the change of said WSDL file to change said client program;
   dynamically replacing the client program being currently operated and which transmitted the request in which the error occurred with a changed client program, wherein the client program is changed by at least the following sub-steps:
   a) taking said revised WSDL file in source codes of said client program;
   b) correcting source code portion of said client program related to said detected change part of the WSDL file defining said interface; and
   c) using said corrected source code portion to prepare an executable client program; and
   re-transmitting the access request to the server program from the said changed client program.

5. A computer program storage media containing instructions for execution by a processor, wherein the instructions comprise:

> error detection means for, when a client program transmits an access request to a server program and an error occurs, analyzing a cause of the error in response to a notification from the client program, wherein said analyzing a cause of the error is made by analyzing contents of a message received from said server program when the error occurs;
>
> error occurrence portion detection means responsive to a notification from said error detection means for detecting a change part of a Web Services Description Language (WSDL) file defining an interface of said server program when the error is caused by change of the WSDL file defining said interface of said server program;
>
> changed client program producing means responsive to a notification from said error occurrence portion detection means for deciding a change portion and a changing scheme of said client program related to the change of the WSDL file defining said interface to produce a changed client program;
>
> client program execution means responsive to a notification from said changed client program producing means for dynamicaly replacing the client program being currently operated and which transmitted the request in which the error occurred with a changed client program, wherein the client program is changed by at least the following sub-steps:
> a) taking said revised WSDL file in source codes of said client program;
> b) correcting source code portion of said client program related to said detected change part of the WSDL file defining said interface; and
> c) using said corrected source code portion to prepare an executable client program; and
> re-transmitting the access request to the server program from the said changed client program.

6. A computer program storage media containing instructions for execution by a processor, wherein the instructions include a client program management program group comprising:

> an error detection program for, when a client program transmits an access request to a corresponding server program and an error occurs, analyzing a cause of the error in response to a notification from the client program, wherein said analyzing a cause of the error is made by analyzing contents of a message received from said server program when the error occurs;
>
> an error occurrence portion detection program responsive to a notification from said error detection program for detecting a change part of a Web Services Description Language (WSDL) file defining an interface of said server program when the error is caused by change of said interface of said server program;
>
> a changed client program producing program responsive to a notification from said error occurrence portion detection program for deciding a change portion and a changing scheme of said client program related to the change of said interface to produce a changed client program;
>
> a client program execution program responsive to a notification from said changed client program producing program for dynamically replacing the client program being currently operated and which transmitted the request in which the error occurred with a changed client program, wherein the client program is changed by at least the following sub-steps:
> a) taking said revised WSDL file in source codes of said client program;
> b) correcting source code portion of said client program related to said detected change part of the WSDL file defining said interface; and
> c) using said corrected source code portion to prepare an executable client program; and
> re-transmitting the access request to the server program from the said changed client program.

7. A client/server system comprising:

> a server computer including a first computer program storage media containing instructions for execution by a first processor, wherein the instructions include a server program comprising;
>
> a registry for storing information related to an interface of said server program; and
>
> a client computer including a second computer program storage media containing instructions for execution by a processor, wherein the instructions include:
>
> a client program corresponding to the server program;
>
> an error detection program for, when said client program transmits an access request to said server program and an error occurs, analyzing a cause of the error in response to a notification from said client program, wherein aid analyzing a cause of the error is made by analyzing contents of a message received from said server program when the error occurs;
>
> an error occurrence portion detection program responsive to a notification from said error detection program for accessing to said registry to detect a change part of a Web Services Description Language (WSDL) file defining an interface of said server program when the error is caused by change of the WSDL file defining said interface of said server program;
>
> a changed client program producing program responsive to a notification from said error occurrence portion detection program for deciding a change portion and a changing scheme of said client program related to the change of the WSDL file defining said interface to produce a changed client program;
>
> a client program execution program responsive to a notification from said changed client program producing program for dynamically replacing the client program being currently operated and which transmitted the request in which the error occurred with a changed client program, wherein the client program is changed by at least the following sub-steps:
> a) taking said revised WSDL file in source codes of said client program;
> b) correcting source code portion of said client program related to said detected change part of the WSDL file defining said interface; and
> c) using said corrected source code portion to prepare an executable client program; and
> re-transmitting the access request to the server program from the said changed client program.

8. A client/server system according to claim 7, wherein said registry is a Universal Description Discovery and Integration (UDDI) registry.

* * * * *